(12) United States Patent
Hoover (10) Patent No.: US 10,364,007 B2
(45) Date of Patent: *Jul. 30, 2019

(54) RELEASABLE FORWARD SECTION OF AN UNDERWATER VEHICLE

(71) Applicant: The Boeing Company, Chicago, IL (US)

(72) Inventor: Randall L. Hoover, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,733

(22) Filed: Oct. 1, 2018

(65) Prior Publication Data

US 2019/0031309 A1 Jan. 31, 2019

Related U.S. Application Data

(63) Continuation of application No. 15/619,908, filed on Jun. 12, 2017, now Pat. No. 10,112,691.

(51) Int. Cl.
*B63G 8/24* (2006.01)
*B63G 8/41* (2006.01)
*B63G 8/00* (2006.01)
*F42B 19/12* (2006.01)
*H04B 13/02* (2006.01)

(52) U.S. Cl.
CPC .............. *B63G 8/24* (2013.01); *B63G 8/001* (2013.01); *B63G 8/41* (2013.01); *B63G 2008/008* (2013.01); *F42B 19/125* (2013.01); *H04B 13/02* (2013.01)

(58) Field of Classification Search
CPC ............. B63G 8/24; B63G 8/41; B63G 8/001
See application file for complete search history.

(56) References Cited

U.S. PATENT DOCUMENTS 3,695,556 A * 10/1972 Gauzza .................. F42B 10/16
  244/3.28
4,296,894 A * 10/1981 Schnabele ............... F42B 15/10
  244/3.1
4,410,151 A * 10/1983 Hoppner ............... B64C 39/024
  244/120

(Continued)

*Primary Examiner* — Lars A Olson
*Assistant Examiner* — Jovon E Hayes
(74) *Attorney, Agent, or Firm* — McDonnell Boehnen Hulbert & Berghoff LLP (57) ABSTRACT

An example underwater vehicle includes a first section detachably coupled to a second section that is positioned forward of the first section, and a hinge detachably coupling the first section to the second section, where the hinge creates a pivot between the first section and the second section. The underwater vehicle includes a lock having a locked position and an unlocked position, where, in the locked position, the lock couples the first section and the second section together, and where, in the unlocked position, the second section is capable of decoupling from the first section. The underwater vehicle also includes a drag fin associated with the second section that is movable to an extended position away from the second section to create a drag force which causes the second section to pivot about the hinge, away from the first section, when the underwater vehicle is traveling through a fluid medium.

20 Claims, 9 Drawing Sheets

(56) References Cited

U.S. PATENT DOCUMENTS

| | | | | |
|---|---|---|---|---|
| 4,844,380 | A | * | 7/1989 | Peoples .................. B64G 1/002 244/3.22 |
| 5,568,901 | A | * | 10/1996 | Stiennon ................ B64G 1/002 244/171.3 |
| 5,806,791 | A | * | 9/1998 | Hatalsky ................ F02K 9/805 244/3.24 |
| 6,056,237 | A | * | 5/2000 | Woodland ................ B64C 3/40 244/3.15 |
| 6,167,831 | B1 | * | 1/2001 | Watt ..................... B63G 8/001 114/245 |
| 6,498,767 | B2 | * | 12/2002 | Carreiro ............... B63B 22/003 244/137.4 |
| 6,612,522 | B1 | * | 9/2003 | Aldrin .................. B64G 1/002 244/159.3 |
| 7,854,410 | B2 | * | 12/2010 | Fanucci ................ B64C 39/024 244/139 |
| 9,733,378 | B2 | * | 8/2017 | Carcaterra ........... G01V 1/3843 |
| 9,969,491 | B2 | * | 5/2018 | Strayer ................ B64C 39/024 |
| 2005/0082419 | A1 | * | 4/2005 | Dryer .................... F42B 30/12 244/3.3 |
| 2009/0107388 | A1 | * | 4/2009 | Crowell .................. B63C 7/26 114/336 |
| 2010/0219285 | A1 | * | 9/2010 | Facciano ............... F42B 10/143 244/3.25 |
| 2016/0178317 | A1 | * | 6/2016 | Powell ................... F41F 3/07 89/1.81 |
| 2017/0057635 | A1 | * | 3/2017 | Strayer ................ B64C 39/024 |

* cited by examiner

RELEASABLE FORWARD SECTION OF AN UNDERWATER VEHICLE

CROSS REFERENCE TO RELATED APPLICATIONS

The present application is a continuation of U.S. application Ser. No. 15/619,908 filed Jun. 12, 2017, the disclosure of which is explicitly incorporated by reference herein in its entirety.

FIELD

The present disclosure generally relates to a releasable forward section of an underwater vehicle.

BACKGROUND

During operation of an underwater vehicle, much of the thrust generated by the underwater vehicle to propel it through the water is used to overcome drag forces acting on the vehicle. Some underwater vehicles, such as smaller, unmanned underwater vehicles, have a limited operational time that is based on a finite fuel supply that can be carried by the underwater vehicle, and is needed to generate the necessary thrust.

What is needed is a way to reduce the drag forces acting on the underwater vehicle during operation, and by doing so, prolong the operational time of the underwater vehicle.

SUMMARY

In one example, an underwater vehicle is described including a first section detachably coupled to a second section, where the second section is positioned forward of the first section. The underwater vehicle also includes a hinge detachably coupling the first section to the second section, where the hinge creates a pivot between the first section and the second section. The underwater vehicle also includes a lock having a locked position and an unlocked position, where, in the locked position, the lock couples the first section and the second section together, and where, in the unlocked position, the second section is capable of decoupling from the first section. The underwater vehicle also includes a drag fin associated with the second section, where the drag fin is movable to an extended position away from the second section to create a drag force which causes the second section to pivot about the hinge away from the first section when the underwater vehicle is traveling through a fluid medium.

In another example, a method of operating an underwater vehicle is described. The method includes disengaging a lock that couples together a first section and a second section of the underwater vehicle, where the second section is positioned forward of the first section, and where the second section is associated with a drag fin. The method also includes moving the drag fin to an extended position away from the second section to create a drag force on the second section as the underwater vehicle travels through a fluid medium. The method also includes pivoting the second section about a hinge as the drag force acts on the second section, where the hinge detachably couples the first section to the second section. The method also includes jettisoning the second section by pivoting the second section about the hinge beyond a release point such that the second section disengages from the first section.

In another example, a non-transitory computer readable medium is described. The non-transitory computer readable medium has instructions stored thereon, that when executed by a computing device, cause the computing device to perform functions including causing an underwater vehicle to be propelled in a forward direction through a fluid medium. The functions also include causing a lock to disengage that, when engaged, couples together a first section and a second section of the underwater vehicle, where the second section is positioned forward of the first section, and where the second section is associated with a drag fin. The functions also include causing the drag fin to move to an extended position away from the second section to create a drag force on the second section as the underwater vehicle is propelled in the forward direction through the fluid medium.

The features, functions, and advantages that have been discussed can be achieved independently in various embodiments or may be combined in yet other embodiments, further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed embodiments will now be described more fully with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Examples discussed herein include an underwater vehicle having one or more releasable forward sections, methods for operating the underwater vehicle, and a computing device to implement such operation. For example, the underwater vehicle may include a forward section containing a portion of the underwater vehicle's fuel. During operation, once the fuel is depleted, the forward section may be released and jettisoned from the underwater vehicle. By reducing the overall length of the underwater vehicle, drag forces due to friction on the underwater vehicle may be reduced, and the remaining operational time may be extended.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
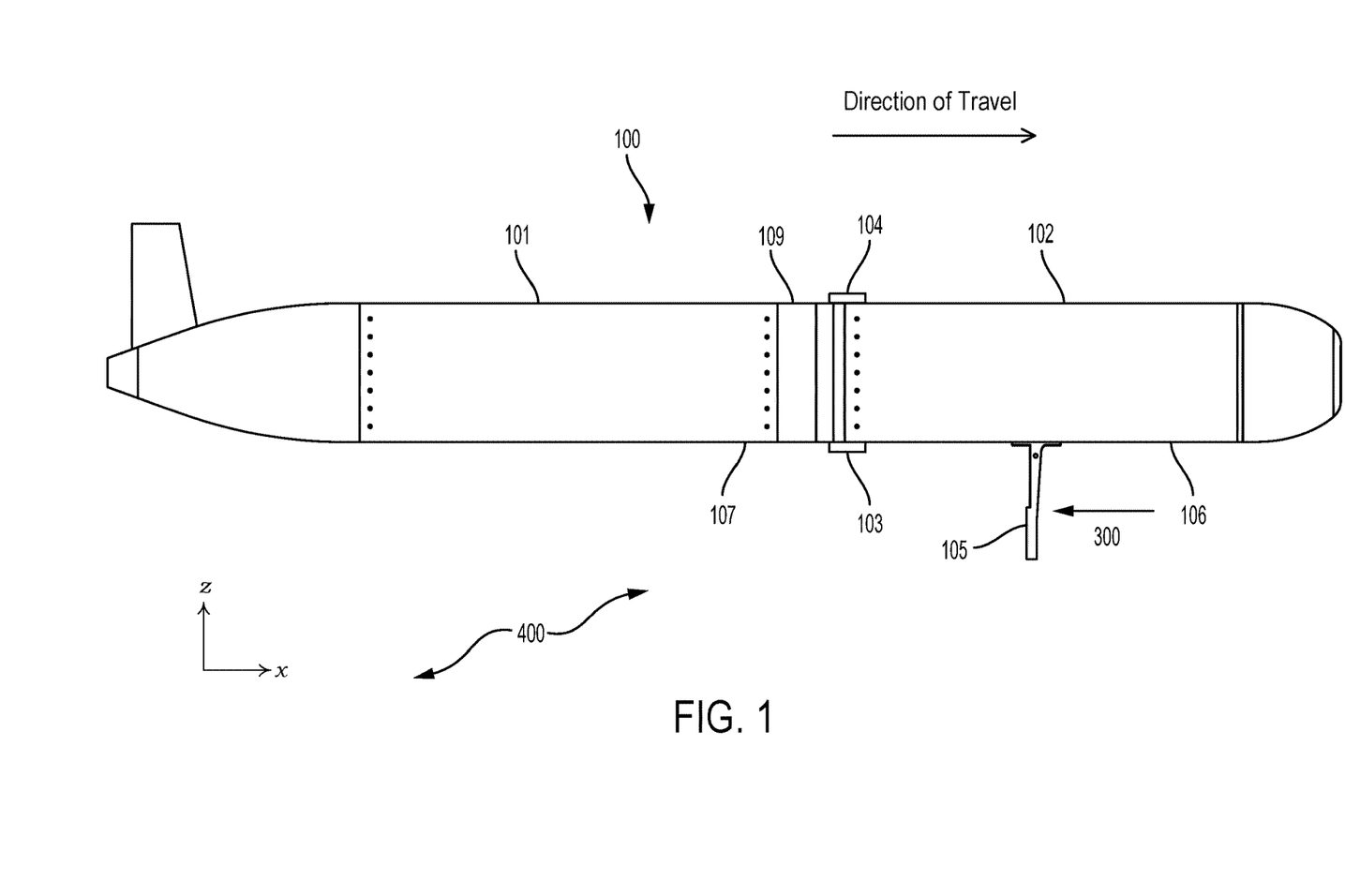
FIG. 1 illustrates a side view of an example underwater vehicle, according to an example implementation.

Referring now to FIG. 1, an example underwater vehicle 100 is shown. The underwater vehicle 100 may be, for instance, a relatively small, unmanned underwater vehicle ("UUV"). The examples and descriptions herein may also be applied to larger UUVs, as well as manned underwater vehicles. Further, the underwater vehicle 100 is depicted travelling through a fluid medium 400, such as water. However, the examples discussed herein might also be applied to vehicles travelling through other media as well, such as an airborne vehicle travelling through air.

As shown in FIG. 1, the underwater vehicle 100 may include a first section 101 that is detachably coupled to a second section 102. The second section 102 is positioned forward of the first section 101. The underwater vehicle 100 may also include a hinge 103 detachably coupling the first section 101 to the second section 102, and creating a pivot between the first section 101 and the second section 102. In FIG. 1, the hinge 103 is shown on the underside 107 of the underwater vehicle 100, at the location where the first section 101 meets the second section 102.

A lock 104 is located on an opposing side 109 of the underwater vehicle 100 from the hinge 103. The lock 104, which may take various forms, includes a locked position and an unlocked position. In the locked positon, the lock 104 couples the first section 101 and the second section 102 together. In the unlocked position, the second section 102 is capable of decoupling from the first section 101. For example, when the lock 104 is in the unlocked position, the second section 102 may be capable of pivoting about the hinge 103. This may involve a rotation of the second section 102 about the pitch axis (y-axis) of the underwater vehicle 100, which may be seen more clearly in FIG. 3. As discussed in more detail below, the hinge 103 may be configured to allow the second section 102 to decouple from the first section 101, after the second section 102 rotates beyond a certain point.

The underwater vehicle 100 shown in FIG. 1 further includes a drag fin 105 associated with the second section 102. The drag fin 105 is movable to an extended position away from the second section 102. For example, the drag fin 105 may initially be in a stowed position, either within or adjacent to the exterior surface 106 of the second section 102. Once moved to the extended position, as shown in FIG. 1, the drag fin 105 may create a drag force 300 which causes the second section 102 to pivot about the hinge 103, away from the first section 101, when the underwater vehicle 100 is travelling through the fluid medium 400.

Figure 2:
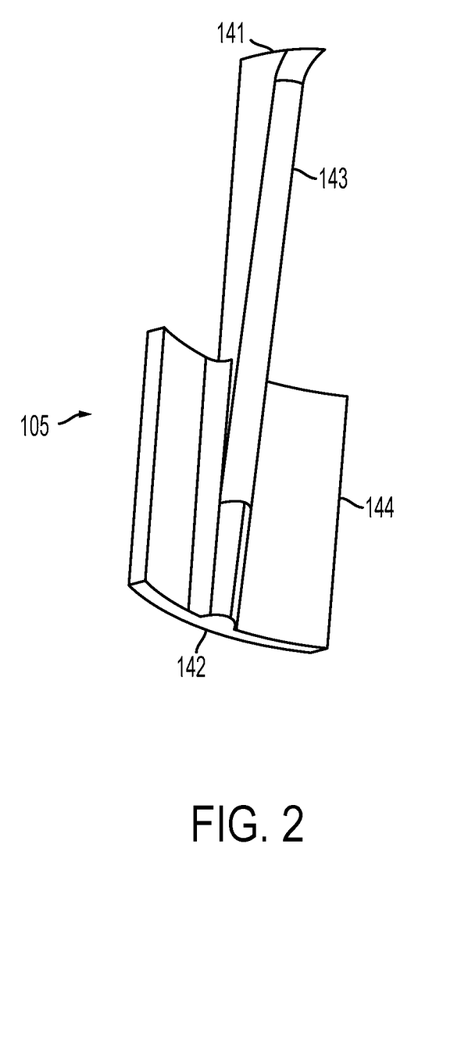
FIG. 2 illustrates an example drag fin, according to an example implementation.

The drag fin 105 may be associated with the second section 102 in various ways. For example, as shown in FIG. 2, the drag fin 105 may include a proximal end 141 and a distal end 142, as well as a shaft 143 and a blade 144. The proximal end 141 of the may be coupled to the second section 102 such that the drag fin 105 is rotatable about its proximal end 141. For instance, the drag fin 105 may be rotatable from a stowed position, wherein the drag fin 105 conforms to the exterior surface 106 of the second section 102, to the extended position where the drag fin 105 is substantially perpendicular to the second section 102, as shown in FIG. 1.

Figure 3:
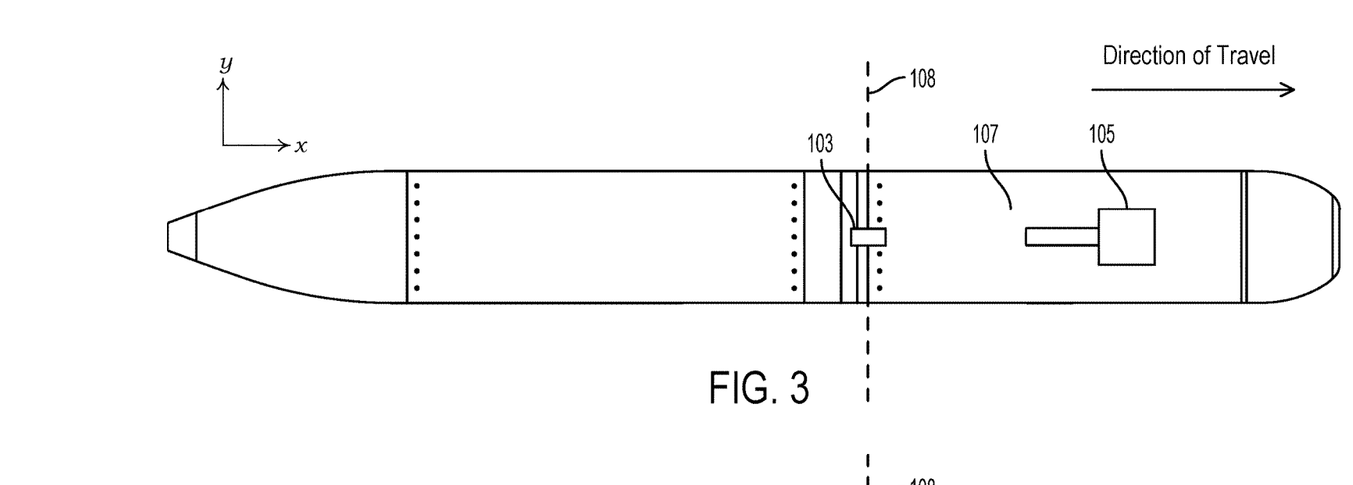
FIG. 3 illustrates a bottom view of an example underwater vehicle, according to an example implementation.

FIG. 3 illustrates a bottom view of the underwater vehicle 100, and shows the drag fin 105 in the stowed position discussed above. In this configuration, the blade 144, which is shown in FIG. 2 as being slightly curved, may conform to the exterior surface 106 of the second section 102, which may be similarly curved. As shown in FIG. 3, the drag fin 105 is positioned forward of, and in substantial alignment with, the hinge 103, which is also located on the underside 107 of the underwater vehicle 100. As discussed above, the hinge 103 in this location allows the second section 102 to freely rotate downward about the pitch axis 108 of the underwater vehicle 100, after the drag fin 105 is moved to the extended position and the lock 104 is in the unlocked position.

In some other implementations, the drag fin 105 may be contained within the second section 102 of the underwater vehicle 100 when in the stowed positon. The drag fin 105 may then be extended from the second section 102 via a linear actuator contained within the second section 102. The linear actuator might be spring loaded, or mechanically controlled. Other possibilities also exist.

Further, the drag fin 105 and the hinge 103 are not necessarily limited to the configuration shown in FIG. 3, on the bottom of the underwater vehicle 100. In other implementations, there may be advantages to locating the hinge 103 and the drag fin 105 on a side, or perhaps the top, of the underwater vehicle 100. In some implementations, the drag fin 105 may begin in a stowed position in the nose of the underwater vehicle 100, among other possibilities.

Figure 4:
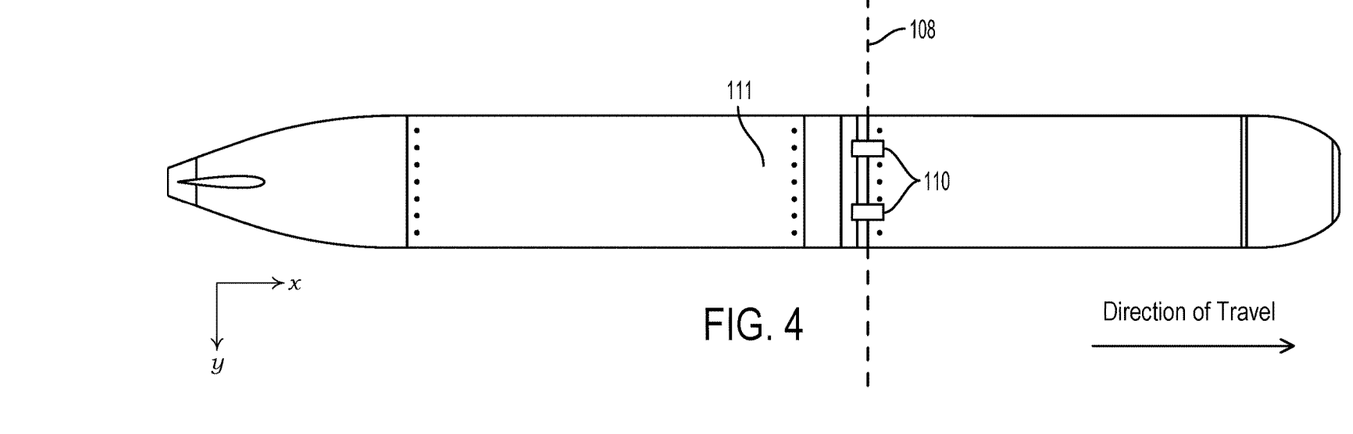
FIG. 4 illustrates a top view of an example underwater vehicle, according to an example implementation.

FIG. 4 illustrates a top view of the underwater vehicle 100. As noted above, the lock 104 shown in FIG. 1 may take various forms, and might not consist of a single locking point on the underwater vehicle 100. For example, in FIG. 4, the lock 104 is shown as a set of clamps 110 positioned on the exterior surface 111 of the underwater vehicle 100, on either side of a centerline of the underwater vehicle 100, at the location where the first section 101 meets the second section 102. As shown in this example, the lock 104 may include a number of components that are not limited to a single location on the exterior surface 111 of the underwater vehicle 100. The lock 104 might also take the form of a latch, or set of latches, which may be contained within the underwater vehicle 100, rather than on the exterior surface 111. Other possibilities also exist.

Figure 5:
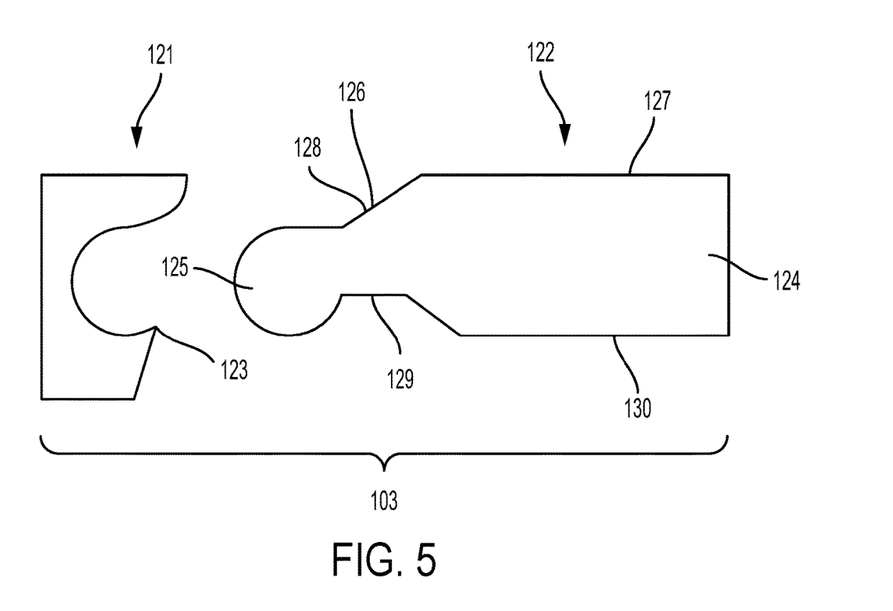
FIG. 5 illustrates an exploded view of an example hinge, according to an example implementation.

FIG. 5 illustrates an exploded view of the hinge 103, according to an example implementation. For instance, the hinge 103 may include a socket 121, which may be fixed to the first section 101 of the underwater vehicle 100, and a body 122, which may be fixed to the second section 102. The body 122 may engage the socket 121 when the first section 101 and the second section 102 are detachably coupled.

In some implementations, the socket 121 may include an open end 123 facing the second section 102. This allows the body 122 to freely disengage from the socket 121 via the open end 123, under some conditions. For example, when the first section 101 is coupled to the second section 102, the body 122 may engage the socket 121, and the lock 104 may be in the locked position. The lock 104 may prevent the body 122 from both rotating downward within the socket 121, as well as translating linearly out of the open end of the 123 of the socket 121.

Further, the relative shapes of the socket 121 and the body 122 may limit the rotation of the body 122 when engaged, and when the lock 104 is in an unlocked position. For instance, the body 122 may include a monolithic portion 124 and a head 125 extending from the monolithic portion 124 at a set of shoulders 126, 129. As shown in FIG. 5, the head 125 is sized to engage the socket 121, and may include a spherical or cylindrical shape. Accordingly, the socket 121 may include a corresponding spherical or cylindrical shape that partially surrounds the head 125 when engaged.

Additionally, the set of shoulders may include a first shoulder 126 on an inboard side 127 (i.e., toward the underwater vehicle 100) of the body 122. The first shoulder 126 may include an angled portion 128 that extends from the head 125 toward the second section 102. The set of shoulders may further include a second shoulder 129 positioned on an outboard side 130 (i.e., away from the underwater vehicle 100) of the body 122.

Figure 6:
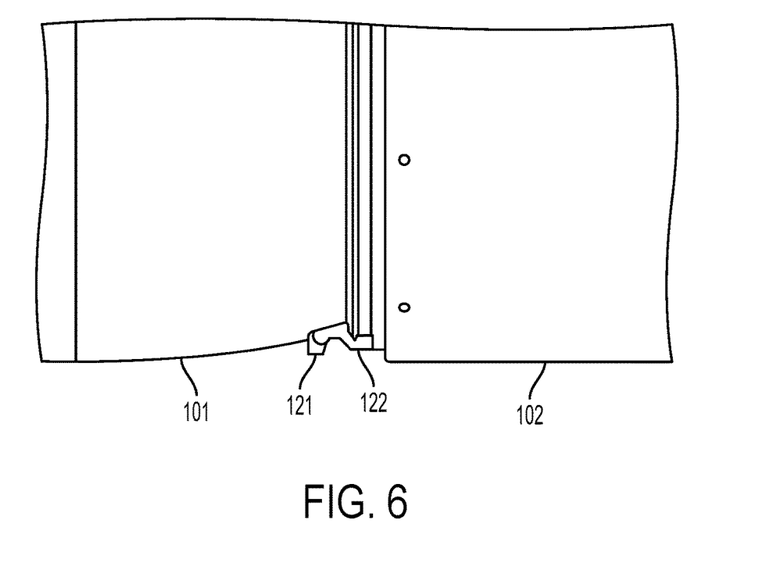
FIG. 6 illustrates an example hinge at a first time of operation, according to an example implementation.

FIGS. 6-9 show a sequence illustrating the hinge 103 during operation of the underwater vehicle 100 in which the second section 102 detaches from the first section 101. The sequence begins at FIG. 6, which shows the hinge 103 at a first time, including the socket 121 fixed to the first section 101, and the body 122 fixed to the second section 102. The body 122 is engaged in the socket 121, and the lock 104 (not shown in FIG. 6) is in a locked position. As shown in FIG. 6, the first section 101 is coupled to the second section 102. Further, the drag fin 105 (not shown in FIG. 6) may be in a stowed position. Accordingly, FIG. 6 may illustrate the configuration of the underwater vehicle 100 for an extended period of time, before the second section 102 is released.

Following the first time shown in FIG. 6, it may be desirable for the underwater vehicle 100 to release the second section 102. For example, the second section 102 may initially contain a portion of the fuel for the underwater vehicle 100, such as a battery pack, a fuel cell, or other combustible fuel, among other possibilities. Once the fuel in the second section 102 is depleted, the second section 102 may be released from the underwater vehicle 100. This reduces the overall length of the underwater vehicle 100, which reduces its exterior surface area and thus the drag forces due to friction acting on the underwater vehicle 100. Consequently, the operational time of the underwater vehicle 100, using the remaining fuel in the first section 101, may be extended. For example, the thrust energy generated by the underwater vehicle 100 that would have otherwise been required to overcome the eliminated drag force may instead be used to operate the underwater vehicle for a longer period of time.

Moreover, the releasable forward section of the underwater vehicle 100 discussed herein may be used for other applications as well. In some implementations, the second section 102 of the underwater vehicle 100 may include a payload to be delivered to a designated location, rather than fuel for the underwater vehicle 100. In this example, the underwater vehicle 100 may navigate to the designated location and then release the second section 102 to deliver the payload. Similarly, the reduced drag forces resulting from the decreased length of the underwater vehicle 100 might provide other benefits, instead of or in addition to increased operating time for the underwater vehicle 100. For instance, the underwater vehicle 100 might utilize the additional thrust energy to move at a higher speed for the remainder of its operating time, rather than extend the operating time. Other possibilities also exist.

To initiate the release of the second section 102, the underwater vehicle 100 may disengage the lock 104 and move the drag fin 105 to the extended position. Because of the forward movement of the underwater vehicle 100 through the fluid medium 400, the drag fin 105 will create a drag force 300 which acts on the second section 102, via the drag fin 105. As noted above, the drag fin 105 is positioned forward of the hinge 103, on the underside 107 of the underwater vehicle 100. Accordingly, the drag force 300 will create a moment tending to rotate the drag fin 105, and thus the attached second section 102, downward about the pitch axis 108 of the underwater vehicle 100, pivoting on the hinge 103.

Figure 7:
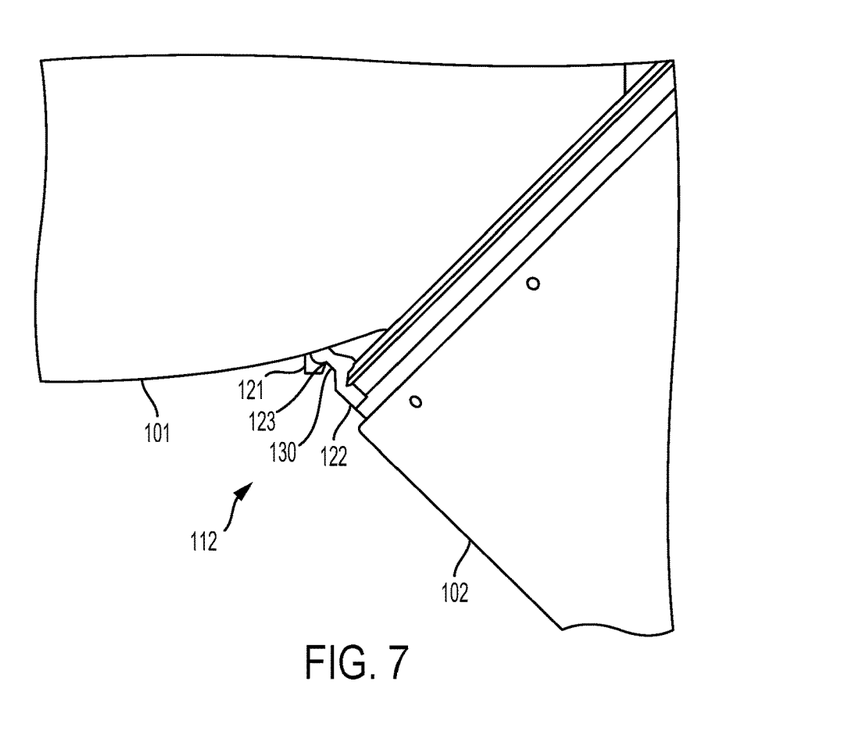
FIG. 7 illustrates the example hinge shown in FIG. 6 at a second time of operation, according to an example implementation.

Turning now to FIG. 7, the hinge 103 is shown at a second time, and the downward rotation of the second section 102 just described can be seen. As shown in FIG. 7, the downward rotation is approximately 60 degrees, which may represent a release point 112 of the second section 102, in some implementations. For example, the release point 112 may include a downward rotation of the second section 102 about the pitch axis 108 of the underwater vehicle 100 such that the second shoulder 129 engages the open end 123 of the socket 121. At the release point 112, the head 125 of the body 122 is still engaged within the socket 121. However, further rotation of the second section 102 and the attached body 122 will cause the head 125 to disengage from the socket 121 via the open end 123.

Figure 8:
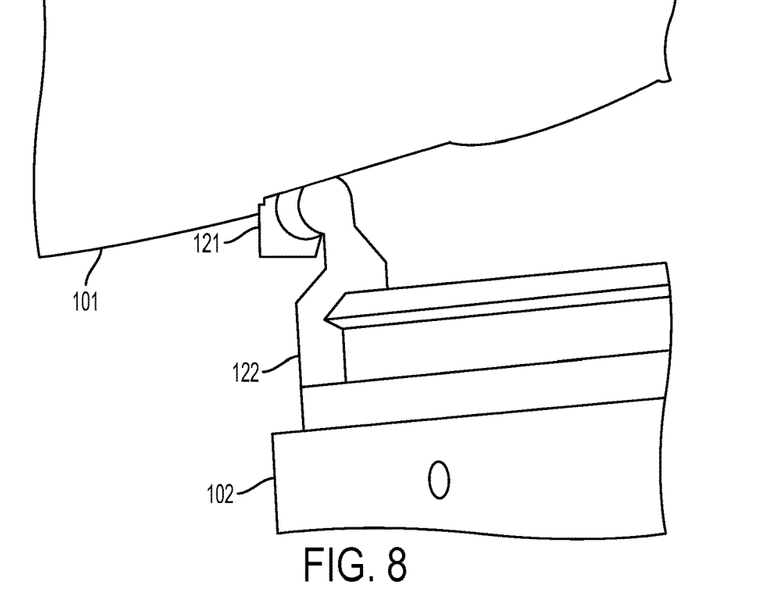
FIG. 8 illustrates the example hinge shown in FIGS. 6 and 7 at a third time of operation, according to an example implementation.

This disengagement can be seen in FIG. 8, which shows the hinge 103 at a third time, and where the rotation of the second section 102 has continued. As shown in FIG. 8, the head 125 has started to translate to the right, disengaging from the socket 121. The rotation of the second section 102 is no longer centered on the head 125 within the socket 121, but rather on the engagement of the second shoulder 129 and the open end of the socket 121. FIG. 8 shows a downward rotation of approximately 80 degrees, at which point, an additional drag force will be acting along the length of the now downturned second section 102, contributing to the continued downward rotation.

Figure 9:
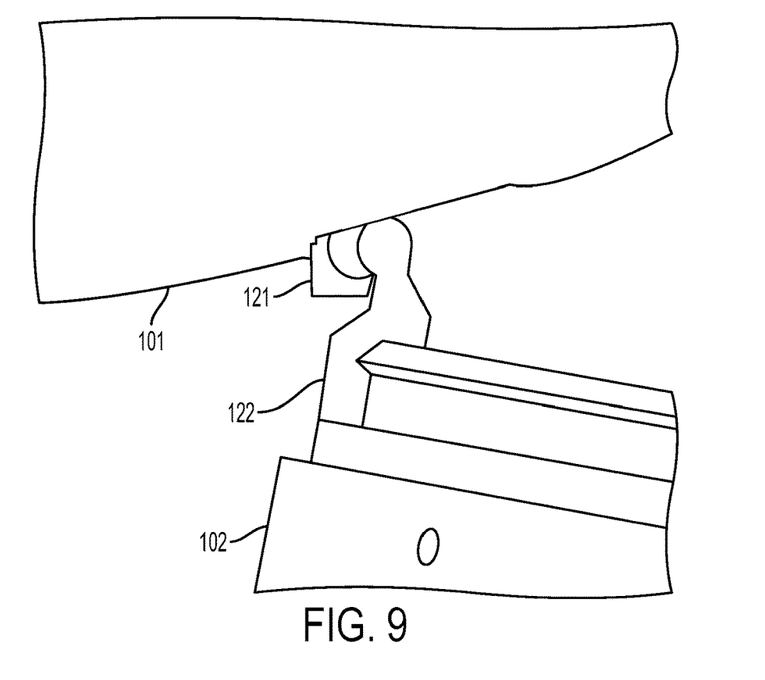
FIG. 9 illustrates the example hinge shown in FIGS. 6, 7 and 8 at a fourth time of operation, according to an example implementation.

FIG. 9 shows the hinge 103 at a fourth time, where the rotation of the second section 102 has continued to approximately 100 degrees, and the head 125 is almost completely disengaged from the socket 121. At this point, the second section 102 may be jettisoned by the continued forward motion of the underwater vehicle 100. Further, because of the location and configuration of the hinge 103 and the drag fin 105, the second section 102 has been guided through the release process shown in FIG. 6-9 to a position where it may avoid interfering or colliding with the first section 101 of the underwater vehicle 100, as it continues its operations.

Figure 10:
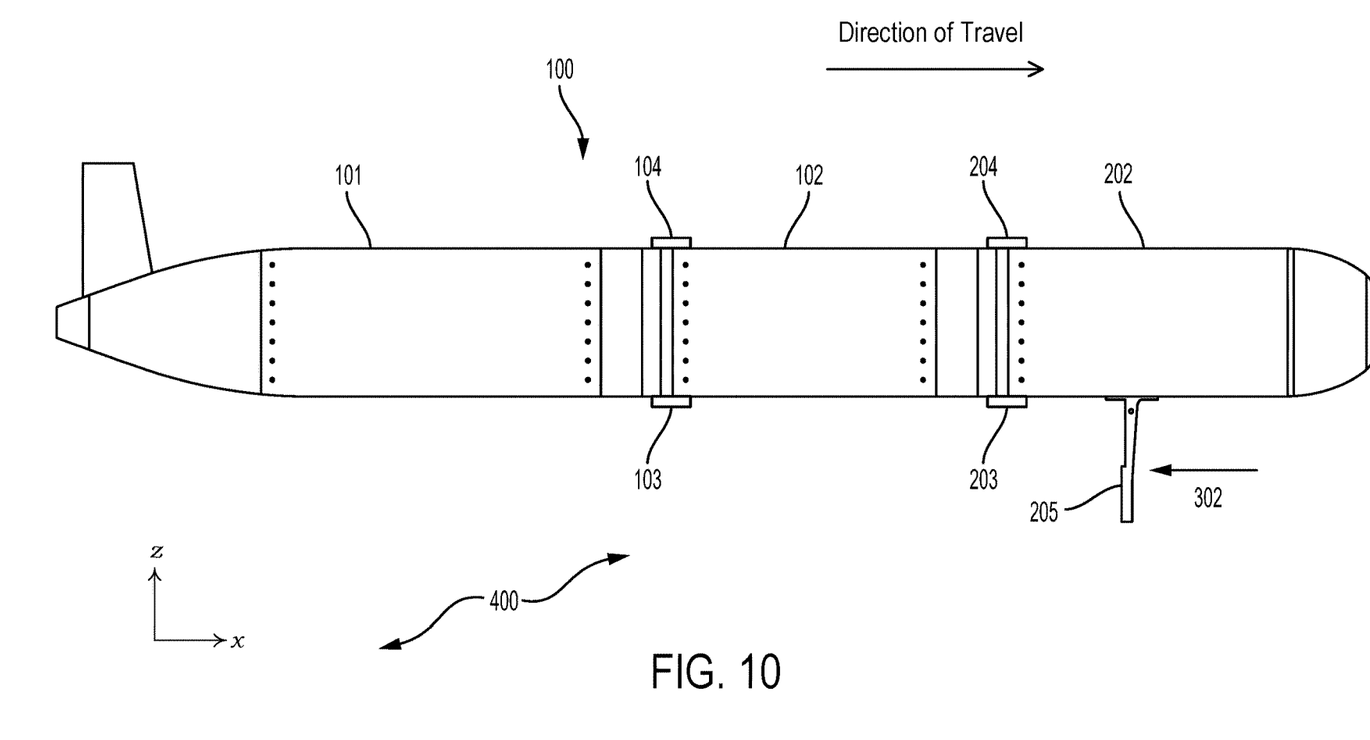
FIG. 10 illustrates a side view of another example underwater vehicle, according to an example implementation.

In some implementations, the underwater vehicle 100 may include more than one releasable section. For instance, FIG. 10 shows an example of the underwater vehicle 100 including an additional third section 202 detachably coupled to the second section 102, where the third section 202 is positioned forward of the second section 102. A second lock 204 detachably couples the second section 102 to the third section 202, where the second hinge 203 creates a pivot between the second section 102 and the third section 202.

Similarly, the underwater vehicle 100 in FIG. 10 includes a second lock 204 having a locked position and an unlocked position, where, in the locked position, the second lock 204 couples the second section 102 and the third section 202 together. In the unlocked position, the third section 202 is capable of decoupling from the second section 102. The underwater vehicle 100 in FIG. 10 also includes a second drag fin 205 associated with the third section 202, where the second drag fin 205 is movable to an extended position away from the third section 202 to create a second drag force 302 which causes the third section 202 to pivot about the second hinge 203 away from the second section 102 when the underwater vehicle 100 is traveling through the fluid medium 400.

For example, the underwater vehicle 100 may include a series of releasable forward sections containing portions of its fuel supply, and these may be released in order as the fuel is depleted. Additionally or alternatively, the underwater vehicle 100 may include one or more payloads for a series of deliveries at a number of designated locations. In this regard, each releasable forward section of the underwater vehicle 100 might have a different size, depending on the particular application.

Figure 11:
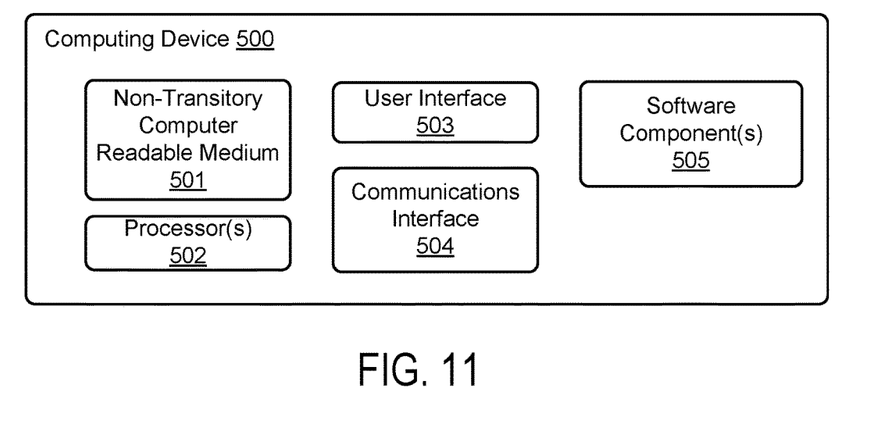
FIG. 11 illustrates a block diagram of an example computing device, according to an example implementation.

FIG. 11 illustrates a block diagram of an example computing device 500 that may be used to implement some or all of the operations noted above. For instance, the computing device 500 may be an onboard computer, or it may be a remote computer that is communicatively coupled to the underwater vehicle 100 via a communications link. Further, the computing device 500 shown in FIG. 11 might not be embodied by a single device, but may represent a combination of computing devices that may or may not be in the same location.

The computing device 500 may include a non-transitory, computer readable medium 501 that includes instructions that are executable by one or more processors 502. The non-transitory, computer readable medium 501 may include other data storage as well, such as navigation data. For example, the underwater vehicle 100 may store navigation data in the non-transitory, computer-readable medium 501 corresponding to a location where it released the second section 102. The stored navigation data may then be used to retrieve the second section 102 at a later time.

In some implementations, the computing device 500 may include a user interface 503 for receiving inputs from a user, and/or for outputting operational data to a user. The user interface 503 might take the form of a control panel located on the underwater vehicle 100, or a graphical user interface at a remote location, connected to the underwater vehicle 100 via a communications interface 504, among other examples. For instance, a command to disengage the lock 104 and move the drag fin 105 to the extended position may be received from a remote user via the user interface 503. The command may be received by the underwater vehicle 100 via a communications interface 504. In other examples, the release process might be initiated automatically, based on pre-determined parameters stored on the non-transitory, computer readable medium 501. Other possibilities also exist.

In addition, the non-transitory, computer readable medium 501 may be loaded with one or more software components 505 stored on the computer readable medium 501 and executable by the processor 502 to achieve certain functions. For example, the underwater vehicle 100 may include various systems that contribute to its operation, such as a navigation system, a forward-looking sonar system, and a propulsion system, among other examples. Each of these systems may be operated in part by software components 505 housed on the non-transitory, computer readable medium 501 and executable by the processor 502.

Figure 12:
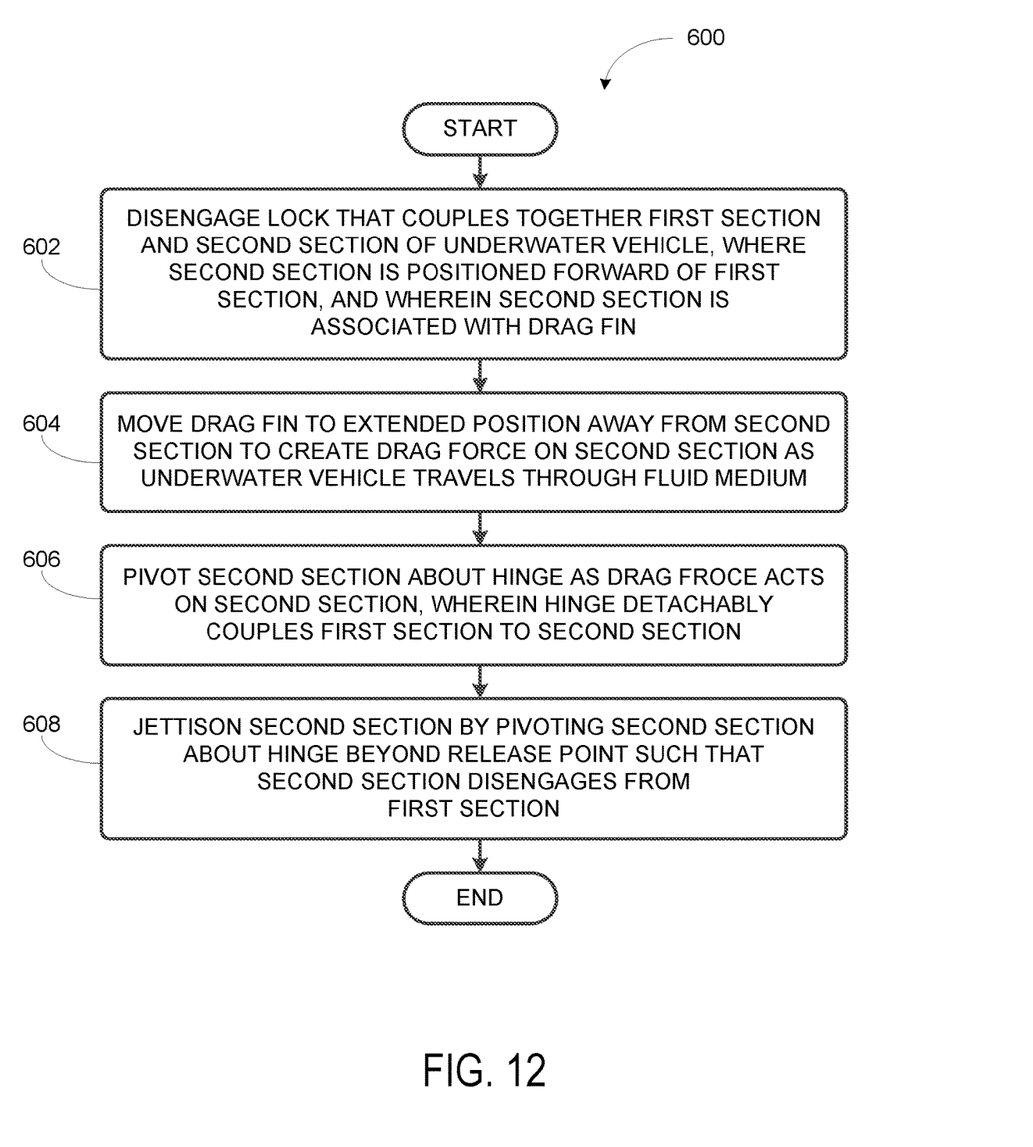
FIG. 12 shows a flowchart of an example method for operating an underwater vehicle.

FIG. 12 shows a flowchart of an example method 600 for operating an underwater vehicle. Method 600 shown in FIG. 12 presents an embodiment of a method that, for example, could be used with the underwater vehicle 100 as shown in FIGS. 1-10 and discussed herein. It should be understood that for this and other processes and methods disclosed herein, flowcharts show functionality and operation of one possible implementation of present embodiments. In this regard, each block in the flowchart may represent a module, a segment, or a portion of program code, which includes one or more instructions executable by a processor, such as the processor 502 of the computing device 500, for implementing or causing specific logical functions or steps in the process. Alternative implementations are included within the scope of the example embodiments of the present disclosure, in which functions may be executed out of order from that shown or discussed, including substantially concurrently, depending on the functionality involved, as would be understood by those reasonably skilled in the art.

At block 602, the method 600 includes disengaging lock 104 that couples together the first section 101 and the second section 102 of the underwater vehicle 100. The second section 102 is positioned forward of the first section 101, as shown in FIG. 1, and the second section 102 is associated with the drag fin 105. In some examples, disengaging the lock 104 may include opening a set of clamps, such as the set of clamps 110 shown in FIG. 4, that are positioned on the exterior surface 111 of the underwater vehicle 100.

At block 604, the method 600 includes moving the drag fin 105 to an extended position away from the second section 102 to create a drag force 300 on the second section 102 as the underwater vehicle 100 travels through the fluid medium 400. As discussed above, the drag fin 105 may be moved to the extended position in various ways. For example, the drag fin 105 may be moved into the extended position by a linear actuator that extends the drag fin 105 from the interior of the underwater vehicle 100.

Alternatively, the drag fin 105 may be moved into the extended position in part by the forward motion of the underwater vehicle 100 through the fluid medium 400. For instance, the method 600 may further include propelling the underwater vehicle 100 in a forward direction through the fluid medium 400. Moving the drag fin 105 to the extended position may involve releasing the distal end 142 of the drag fin 105 from a stowed position, where the drag fin 105 conforms to the exterior surface 111 of the second section 102. FIG. 3 illustrates an example of this stowed position. For example, releasing the distal end 142 of the drag fin may involve releasing a catch or latch that is maintaining the distal end 142 of the drag fin 105 against the second section 102.

Once the distal end 142 of the drag fin 105 is released, the distal end 142 may begin to separate from the exterior surface 111 of the underwater vehicle 100, rotating downward about the proximal end 141 of the drag fin 105. This may allow the drag force 300 to act on the drag fin 105 such that the drag force 300 moves the drag fin 105 to the extended position. For example, moving the drag fin 105 to the extended position may involve rotating the drag fin 105 about its proximal end 141 such that the drag fin 105 is substantially perpendicular to the second section 102.

In some embodiments, releasing the distal end 142 of the drag fin 105 may involve displacing the distal end 142 such that it is positioned away from the exterior surface 111 of the underwater vehicle 100. For instance, when stowed, the distal end 142 of the drag fin 105 may compress a spring. When released, the spring may extend and push the distal end 142 of the drag fin 105 away from the second section 102. This may allow the drag force 300 to more readily act on the drag fin 105.

At block 606, the method 600 includes pivoting the second section 102 about the hinge 103 as the drag force 300 acts on the second section 102. The hinge 103, as discussed above, detachably couples the first section 101 to the second section 102. In some examples, pivoting the second section 102 about the hinge 103 includes rotating the second section 102 downward about a pitch axis 108 of the underwater vehicle 100.

At block 608, the method 600 includes jettisoning the second section 102 by pivoting the second section 102 about the hinge 103 beyond a release point such that the second section 102 disengages from the first section 101. For example, as discussed above with respect to FIGS. 6-9, pivoting the second section 102 about the hinge 103 beyond the release point 112 may first involve rotating the body 122 of the hinge 103, centered on the head 125 engaged within the socket 121, until the release point 112. As noted above, the release point 112 is shown in FIG. 7, and occurs where the second shoulder 129 engages the open end 123 of the socket 121. Prior to the release point 112, the head 125 remains engaged in the socket 121, whereas after the release point 112, further rotation of the body 122 disengages the head 125 from the socket 121.

Accordingly, after the second shoulder 129 engages the open end 123 of the socket 121, pivoting the second section 102 beyond the release point 112 involves further rotating the body 122, centered on the engagement of the second shoulder 129 and the open end 123 of the socket 121, until the head 125 disengages completely from the socket 121.

As noted above, the underwater vehicle 100 may include additional, releasable forward sections. Thus, the method 600 shown in FIG. 12 may include additional blocks corresponding to the release of the additional sections, as may be implemented by the example underwater vehicle 100 shown in FIG. 10. For example, before carrying out any of the operations discussed above with respect to blocks 602-608, the underwater vehicle 100 may first release a third section 202. This may involve disengaging the second lock 204 that couples together the second section 102 and the third section 202 of the underwater vehicle 100, where the third section 202 is positioned forward of the second section 102, and where the third section 202 is associated with the second drag fin 205.

The method may further involve moving the second drag fin 205 to an extended position away from the third section 202 to create the second drag force 302 on the third section 202 as the underwater vehicle 100 travels through the fluid medium 400. It should be noted that the second drag force 302 is characterized as the "second" force for consistency of labeling only—because the third section 202 is released prior to the second section 102, the second drag force 302 will necessarily act on the underwater vehicle 100 prior to the "first" drag force 300 discussed above.

Releasing the third section 202 may further involve pivoting the third section 202 about the second hinge 203 as the second drag force 302 acts on the third section 202, where the second hinge 203 detachably couples the second section 102 to the third section 202. For instance, the sequence positions for the hinge 103 shown in FIGS. 6-9 and discussed above may equally apply to the hinge 203. Similarly, the method 600 may further include jettisoning the third section 202 by pivoting the third section 202 about the second hinge 203 beyond a release point 112 such that the third section 202 disengages from the second section 102.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An underwater vehicle comprising:
a first section detachably coupled to a second section, wherein the second section is positioned forward of the first section;
a lock having a locked position and an unlocked position, wherein, in the locked position, the lock couples the first section and the second section together, and wherein, in the unlocked position, the second section is capable of decoupling from the first section; and
a drag fin associated with the second section, wherein the drag fin creates a drag force which causes the second section to pivot away from the first section when the underwater vehicle is traveling through a fluid medium.

2. The underwater vehicle of claim 1, wherein the drag fin is movable from a stowed position to an extended position.

3. The underwater vehicle of claim 2, wherein the drag fin comprises a proximal end and a distal end, wherein the proximal end of the drag fin is coupled to the second section, wherein the drag fin is rotatable about its proximal end from the stowed position where the drag fin conforms to an exterior surface of the second section, to the extended position where the drag fin is substantially perpendicular to the second section.

4. The underwater vehicle of claim 1, further comprising a hinge detachably coupling the first section to the second section, wherein the hinge creates a pivot between the first section and the second section.

5. The underwater vehicle of claim 4, wherein the hinge is positioned on an underside of the underwater vehicle such that, in the unlocked position, the second section freely rotates downward about a pitch axis of the underwater vehicle.

6. The underwater vehicle of claim 4, wherein the hinge comprises:
a socket fixed to the first section; and
a body fixed to the second section, wherein the body engages the socket when the first section and the second section are detachably coupled.

7. The underwater vehicle of claim 6, wherein the socket comprises an open end facing the second section, and wherein the body freely disengages from the socket via the open end.

8. The underwater vehicle of claim 6, wherein the body comprises:
a monolithic portion; and
a head extending from the monolithic portion at a set of shoulders, wherein the head comprises a spherical or cylindrical shape sized to engage the socket.

9. The underwater vehicle of claim 8, wherein the set of shoulders comprises:

a first shoulder on an inboard side of the body, wherein the first shoulder comprises an angled portion that extends from the head toward the second section; and a second shoulder positioned on an outboard side of the body.

10. The underwater vehicle of claim 9, wherein a release point of the second section comprises a downward rotation of the second section about a pitch axis of the underwater vehicle such that the second shoulder engages the open end of the socket.

11. The underwater vehicle of claim 4, wherein the drag fin is positioned forward of, and in substantial alignment with, the hinge.

12. The underwater vehicle of claim 4, wherein the lock is positioned on an opposing side of the underwater vehicle from the hinge.

13. A method of operating an underwater vehicle comprising:

disengaging a lock that couples together a first section and a second section of the underwater vehicle, wherein the second section is positioned forward of the first section, and wherein the second section is associated with a drag fin that creates a drag force on the second section as the underwater vehicle travels through a fluid medium;

pivoting the second section away from the first section as the drag force acts on the drag fin; and jettisoning the second section.

14. The method of claim 13, further comprising:

moving the drag fin from a stowed position to an extended position.

15. The method of claim 14, wherein the drag fin comprises a proximal end coupled to the second section, and wherein moving the drag fin comprises rotating the drag fin about its proximal end from the stowed position to the extended position where the drag fin is substantially perpendicular to the second section.

16. The method of claim 13, further comprising a hinge detachably coupling the first section to the second section, wherein pivoting the second section away from the first section comprises pivoting the second section about the hinge.

17. The method of claim 16, wherein pivoting the second section about the hinge comprises rotating the second section downward about a pitch axis of the underwater vehicle.

18. The method of claim 16, wherein the hinge comprises a socket fixed to the first section and a body fixed to the second section, wherein the body engages the socket when the first section and the second section are detachably coupled, wherein the body comprises a monolithic portion and a head extending from the monolithic portion at a set of shoulders, wherein the set of shoulders comprises a first shoulder on an inboard side of the body and a second shoulder positioned on an outboard side of the body, and wherein pivoting the second section about the hinge comprises:

rotating the body, centered on the head engaged within the socket, until a release point wherein the second shoulder engages an open end of the socket; and after the second shoulder engages the open end of the socket, rotating the body, centered on the engagement of the second shoulder and the open end of the socket, until the head disengages completely from the socket.

19. The method of claim 13, wherein disengaging the lock comprises opening a set of clamps positioned on an exterior of the underwater vehicle.

20. A non-transitory computer readable medium having stored thereon instructions that, when executed by a computing device, cause the computing device to perform functions comprising:

causing an underwater vehicle to be propelled in a forward direction through a fluid medium, wherein the underwater vehicle comprises a first section and second section positioned forward of the first section, and wherein the second section contains fuel for the underwater vehicle;

determining that the fuel contained within the second section has been depleted; and based on the determination that the fuel contained within the second section has been depleted, causing a lock to disengage that, when engaged, couples together the first section and the second section of the underwater vehicle, wherein the second section is positioned forward of the first section, and wherein the second section is associated with a drag fin.

* * * * *